United States Patent [19]
Korner et al.

[11] 3,825,669
[45] July 23, 1974

[54] HIGH TEMPERATURE, HIGH PRESSURE ELECTRICAL PENETRATION ASSEMBLY

[75] Inventors: Renzo L. Korner, Horseheads; Ralph J. White, Montour Falls; Robert A. Shaffer; George R. Turner, both of Elmira, all of N.Y.

[73] Assignee: Westinghouse Electric Corporation, Pittsburgh, Pa.

[22] Filed: May 29, 1973

[21] Appl. No.: 364,452

[52] U.S. Cl. .............................. 174/11 R, 174/151
[51] Int. Cl. ..................... H01b 17/26, G21c 13/02
[58] Field of Search ........ 174/11 R, 18, 23 R, 77 R, 174/102 P, 118, 151, 152 R

[56] References Cited
UNITED STATES PATENTS
3,601,526  8/1971  Bohne et al. ..................... 174/151
3,735,024  5/1973  Walker, Sr. ........................ 174/151
FOREIGN PATENTS OR APPLICATIONS
913,243  12/1962  Great Britain ..................... 174/151

Primary Examiner—Laramie E. Askin
Attorney, Agent, or Firm—W. G. Sutcliff

[57] ABSTRACT

An electrical penetration assembly for high temperature, high pressure applications, such as for bringing electrical conductors through a nuclear reactor primary vessel or containment vessel. The electrical conductors are disposed within refractory oxide which has a gas impervious outer sheath thereabout. A seal is provided between the electrical conductors and the outer sheath at spaced positions. The sheathed conductor is passed through aligned apertures in headers which permit easy connection and sealing of the assembly to an exit port of the vessel. The outer sheaths are sealed to each header. The headers are spaced apart to provide a chamber therebetween, and an aperture is provided through the sheath within the chamber to permit leak detection.

8 Claims, 3 Drawing Figures

PATENTED JUL 23 1974 3,825,669

HIGH TEMPERATURE, HIGH PRESSURE ELECTRICAL PENETRATION ASSEMBLY

BACKGROUND OF THE INVENTION

The present invention is concerned with apparatus for making electrical connections through a vessel wall where the electrical connection must withstand high temperature, high pressure ambient conditions. The apparatus is more specifically intended for use with nuclear reactor vessels wherein the integrity and reliability of the seal are particularly important. Such sealed electrical connectors are known in the art as electrical penetration assemblies.

The prior art electrical penetration assemblies have included a simple electrical conductor which is sealed to a ceramic insulator which is in turn sealed to the metal containment wall of a nuclear reactor. Such ceramic to metal sealing techniques are well known. After the penetration assemblies are sealed to the vessel, the in-vessel wiring and out-of-vessel wiring is electrically connected to the penetration conductor. Numerous electrical penetrations must be brought through the reactor vessel as well as through the larger containment vessel of a typical pressurized water nuclear reactor facility. The conductors may range in size from small instrumentation wiring to high power cables which may be as large as one inch in diameter. Ceramic to metal sealing is considered an art to be practiced under controlled circumstances, and therefore prior art devices have entailed a very high labor cost during on-site assembly and construction of the facility. It is also known in the art to build a ceramic to metal sealed penetration which has two such conductor seals at either end of an intermediately defined leak detecting chamber, so that any leakage from the seal to the reactor vessel can be detected.

SUMMARY OF THE INVENTION

An electrical penetration assembly for high temperature, high pressure usage, comprising at least one electrical conductor which is encompassed for a predetermined length within a densified body of refractory insulating material. The refractory material is in turn disposed within a substantially gas impervious outer sheath. An electrically insulating sealant is provided at each end of the predetermined length of refractory insulator and outer sheath between the electrical conductor and the outer sheath. The sheathed conductor is brought through aligned apertures in a spaced apart first and second header, with the sheath being sealed to each header. The headers define a chamber between each other, and an aperture is provided through the sheath portion within the chamber. A sealable aperture is provided through the second header for monitoring whether the penetration is operational.

DESCRIPTION OF THE PREFERRED EMBODIMENT

Figure 1:
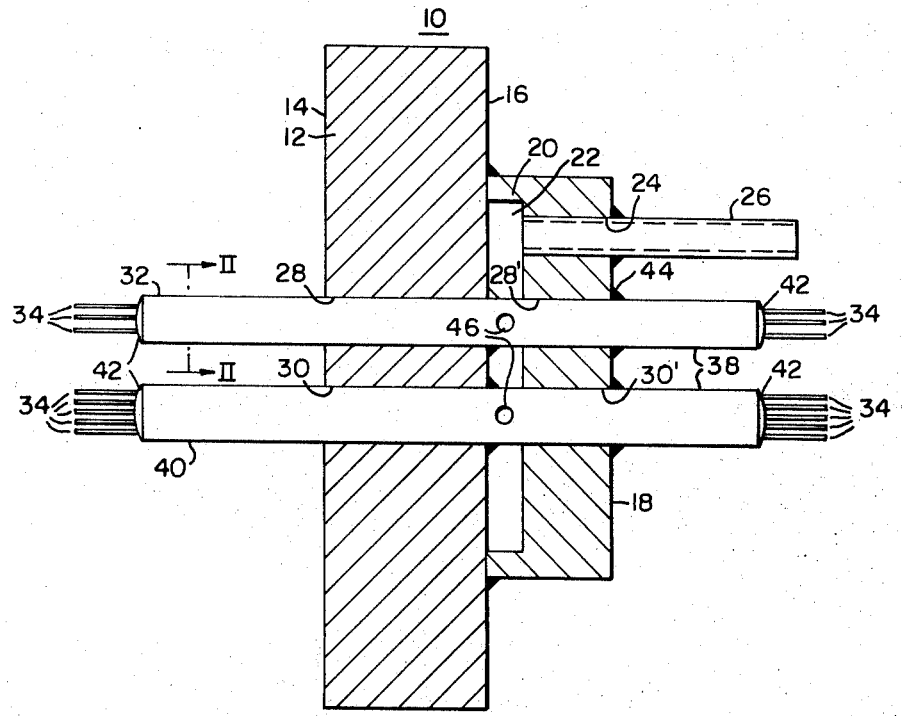
FIG. 1 is a side elevational view of an electrical penetration assembly of the present invention.

The invention can be best understood by reference to the exemplary embodiment shown in the drawings. In FIG. 1, the electrical penetration assembly 10 comprises a first header or flange 12, which is formed of a high strength, radiation resistant material such as stainless steel. One face 14 of the header or flange may include a sealing means such as a knife edge sealing surface, not shown, which permits sealing engagement of the header 12 to a mating reactor vessel port or flange. Any conventional sealing means can be utilized such as an O-ring seal or even a weld. A plurality of bolt holes may be provided through the header or flange 12 to facilitate such sealing.

The other face 16 of header 12 is the ambient side and has a second header or flange 18 sealed thereto in a spaced apart relationship, with a circumferential rim portion 20 of header 18 extending toward the first header and being braze sealed to face 16. The second header 18 is typically of the same material as the first header, such as stainless steel, but since second header 18 is not exposed to the reactor pressure, the material requirements are not as stringent. A chamber 22 is defined between the spaced apart first and second headers 12 and 18. An aperture 24 and sealed-in tubulation 26 are provided through the second header. The tubulation 26 is connectable to leak detection means, not shown, which permits monitoring of any leaks through the penetration.

Aligned apertures 28, 28' and 30, 30' are provided respectively through the first and second headers 12 and 18. A plural conductor sheathed penetration 32 is passed through the aligned apertures 28, 28' and comprises plural electrical conductors 34, with three shown here, which are encompassed within densified refractory insulating material 36 such as alumina, or magnesia. An outer sheath 38 is provided about the refractory insulating material. The outer sheath 38 is substantially impervious to gas, and is preferably a swagable metal such as copper or stainless steel. A second plural conductor sheathed penetration 40 is shown which is the same as penetration 32 except that it is shown with five conductors instead of three conductors.

A sealant 42 is provided at each end of the length of each sheathed penetration 32, 40. The sealant provides a seal between the metallic electrical conductors 34 and gas impervious outer sheath 38. A typical sealant is a silicone resin, such as "SYLGARD" 185 or 183 a Dow-Corning trademark material. Other high pressure, high temperature and radiation resistant sealants can also be used, such as epoxy cement such as "Scotchcast XR5126" a 3M Corporation trademark material, ceramic cement such as "DUROCK-DUROSEAL" T39-A a trademark material of Physical Services Company, vitreous material such as solder glass.

The sheaths 38 of penetrations 32 and 40 are braze sealed or otherwise sealed to the first and second headers as generally shown by braze seals 44. The braze seals 44 are preferably on the low pressure sides of the headers for structural design consideration.

The sheathed electrical penetrations 32 and 40 are preferably swage formed which densifies the finely divided refractory oxide insulating material about the electrical conductors 34. The multiple seals and the simplified structure of the present assembly provides a very reliable electrical penetration which is easily fabricated in a manufacturing operation, and is easily attached to the reactor vessel on site with considerable savings in time of assembly.

An aperture 46 is provided through the sheath 38 of each penetration 32, 40, at a sheath position within the chamber 22, so that any leakage along the length of the penetration can be easily monitored.

Figure 2:
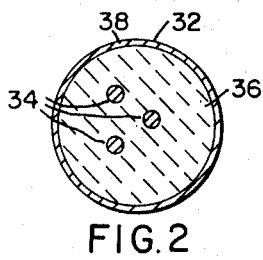
FIG. 2 is an enlarged cross sectional view of the sheathed conductor along lines II—II of FIG. 1.
Figure 3:
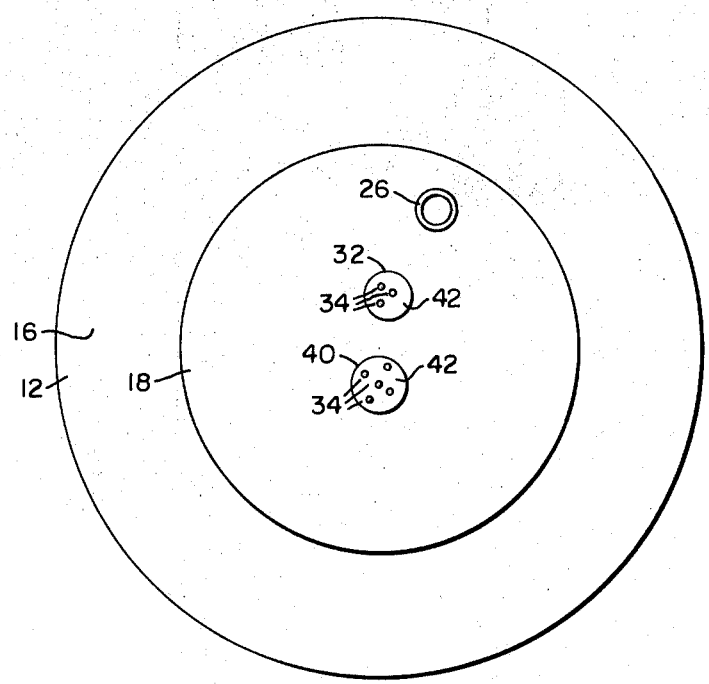
FIG. 3 is an end view of the assembly of FIG. 1 from the righthand side looking toward the left.

A view of the assembly from the ambient side or second header side is seen in FIG. 3, while FIG. 2 provides an enlarged view of the sheathed penetration itself.

The number and size of the electrical conductors in each penetration is a matter of design choice. Other materials substitutions which can be made are readily apparent to one skilled in the art.

The assembly can be used for a variety of electrical penetration applications which involve a sealed environment, and is not limited to its usage with nuclear reactor containments and vessels.

What is claimed is:

1. An electrical penetration assembly comprising at least one electrical conductor which is encompassed for a predetermined length within a densified body of refractory insulating material which is diposed within a substantially gas impervious outer sheath, an electrically insulating sealant is provided at each end of the predetermined length of refractory insulator and outer sheath between the electrical conductor and the outer sheath, a first header which is sealably connectable to an isolated system, a second header sealably attached to the exterior side of the first header and spaced therefrom to define a chamber therebetween, the sheathed conductor extends through aligned apertures in the first and second header, and the sheath is sealed to each header, and an aperture is provided through the sheath in the sheath portion disposed within the chamber between the headers, a sealable aperture is provided through the second header to permit connection to leak detection means.

2. The assembly specified in claim 1, wherein a plurality of electrical conductors are spaced apart encompassed within the refractory insulating material and outer sheath.

3. The assembly specified in claim 1, wherein the refractory insulating material comprises finely divided refractory metal oxide.

4. The assembly specified in claim 3, wherein the refractory metal oxide is selected from the group consisting of alumina and magnesia.

5. The assembly specified in claim 1, wherein the outer sheath comprises swagable metal.

6. The assembly specified in claim 1, wherein the sealant between the electrical conductor and the outer sheath is selected from the group consisting of vitreous glass, ceramic material, epoxy cement, and silicone resin.

7. The assembly specified in claim 1, wherein the outer sheath is braze sealed to the respective headers.

8. The assembly specified in claim 1, wherein a plurality of sheathed conductors extend through a plurality of aligned apertures in the respective headers, with the respective sheaths being sealed to each header.

* * * * *